(12) United States Patent  (10) Patent No.: US 8,699,335 B1
Wang et al.  (45) Date of Patent: Apr. 15, 2014

(54) SYSTEM AND METHOD FOR DETERMINING DATA SERVICE QUALITY INDEX FOR A WIRELESS DATA CONNECTION

(71) Applicant: MetroPCS Wireless, Inc., Richardson, TX (US)

(72) Inventors: Yijiong Wang, Plano, TX (US); Ronald Unger, Dallas, TX (US); Edward Chao, Plano, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 13/852,506

(22) Filed: Mar. 28, 2013

Related U.S. Application Data

(60) Provisional application No. 61/788,288, filed on Mar. 15, 2013.

(51) Int. Cl.
  *G01R 31/08* (2006.01)
(52) U.S. Cl.
  USPC .......................................................... 370/230
(58) Field of Classification Search
  USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/520–529
  See application file for complete search history.

(56) References Cited

U.S. PATENT DOCUMENTS

| | | | |
|---|---|---|---|
| 2003/0152034 A1* | 8/2003 | Zhang et al. | 370/252 |
| 2004/0030797 A1* | 2/2004 | Akinlar et al. | 709/232 |
| 2006/0287993 A1* | 12/2006 | Yao et al. | 707/4 |
| 2007/0058546 A1* | 3/2007 | Na | 370/230 |
| 2008/0139197 A1* | 6/2008 | Misra et al. | 455/423 |

* cited by examiner

*Primary Examiner* — Jung-Jen Liu
(74) *Attorney, Agent, or Firm* — Howison & Arnott, L.L.P.

(57) ABSTRACT

A method for determining a quality of a wireless data connection including receiving a thruput of the wireless data connection, a data round trip time, a number of clicks needed to receive a predetermined data value and a packet loss percentage. A determination of a data quality index value for the wireless data connection is made responsive to the thruput of the wireless data connection, the data round trip time, the number of clicks needed to receive the predetermined data value and the packet loss percentage. The data quality index value for the wireless data connection is then provided.

27 Claims, 7 Drawing Sheets

SYSTEM AND METHOD FOR DETERMINING DATA SERVICE QUALITY INDEX FOR A WIRELESS DATA CONNECTION

CROSS-REFERENCE TO RELATED APPLICATIONS

This application claims benefit of U.S. Provisional Application No. 61/788,288, filed Mar. 15, 2013, entitled SYSTEM AND METHOD FOR DETERMINING DATA SERVICE QUALITY INDEX FOR A WIRELESS DATA CONNECTION, the specification of which is incorporated herein in its entirety.

TECHNICAL FIELD

The present invention relates to data connection quality classification, and more particularly, to a system and method for generating an index representing the quality of data service being provided over a wireless connection within a cellular telecommunication system.

BACKGROUND

Within a cellular telecommunications system, a number of wireless connections are provided to various system subscribers from base stations controlled and provided by a cellular services provider. These wireless connections may provide both voice service and data services, depending upon a subscription level of a particular user. Presently, there exists no single universal index number to reflect the data service quality experienced by a particular user or a group or users when accessing their wireless telecommunications and data services.

Presently there exists a number of indicators to reflect the quality of a user data system that include the download thruput rate, round trip time, and packet loss percentage. However, each of these inputs individually do not adequately reflect or measure the data service quality of a particular connection. Thus, there is a need for a method that more accurately can reflect the data quality level being experienced by a particular connection or a user in order to provide service providers the ability to analyze and control their operations with respect to the provision of data connections.

SUMMARY

The present invention, as disclosed and described herein, in one aspect thereof, comprises a method for determining a quality of a wireless data connection including receiving a thruput of the wireless data connection, a data round trip time, a number of clicks needed to receive a predetermined data value and a packet loss percentage. A determination of a data quality index value for the wireless data connection is made responsive to the thruput of the wireless data connection, the data round trip time, the number of clicks needed to receive the predetermined data value and the packet loss percentage. The data quality index value for the wireless data connection is then provided.

BRIEF DESCRIPTION OF THE DRAWINGS

For a more complete understanding, reference is now made to the following description taken in conjunction with the accompanying Drawings in which.

DETAILED DESCRIPTION

Figure 1:
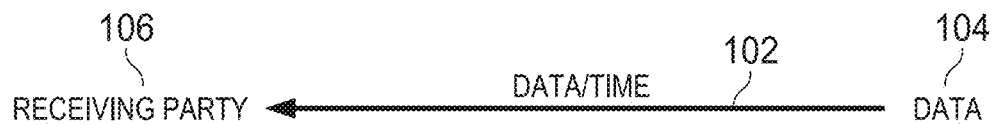
FIG. 1 illustrates thruput from a data transmission unit to a receiving party.

Referring now to the drawings, wherein like reference numbers are used herein to designate like elements throughout, the various views and embodiments of a system and method for determining data service quality index for a wireless data connection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The present disclosure describes a method for generating a data quality index (DQI) that provides a single index to quantify a user's experience with respect to a wireless data communications channel. The DQI utilizes a combination of various factors in order to quantify the quality of a data connection. Referring now to FIG. 1, a first quantity used for quantifying the DQI is the data thruput. The data thruput represents the amount of data transmitted per unit time 102 from a data transmitting unit 104 to a receiving party 106.

Figure 2:
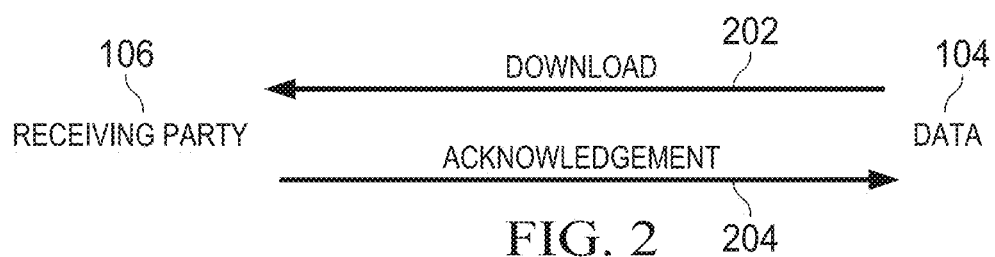
FIG. 2 illustrates round trip time between a receiving party and the data transmission unit.

The DQI also includes the weighted round trip time. The round trip time, as illustrated in FIG. 2, represents the amount of time for an acknowledgement 204 to come from the receiving party 106 responsive to the data transmission unit 104 and the requested data to be downloaded 202 to the receiving party 106 from the data transmission unit 104. The round trip time is weighted by the type of connection that is being used and is weighted by the clicks per megabyte. The clicks per megabyte represent the number of clicks of a user on a URL link within a web browser that is necessary to transmit one megabyte of data.

For example, if a user is browsing through internet pages on an IP network, the average clicks per megabyte for this type of operation is assumed to be ten. When a user is downloading music over a DO network, the clicks per megabyte is assumed to be two. For a video application on an LTE network, the clicks per megabyte is assumed to be one. As can be seen, the high data volume applications such as video and music require a much smaller number of clicks to achieve a megabyte of data transmitted than is used in a more text or image intensive operation such as web browsing.

Figure 3:
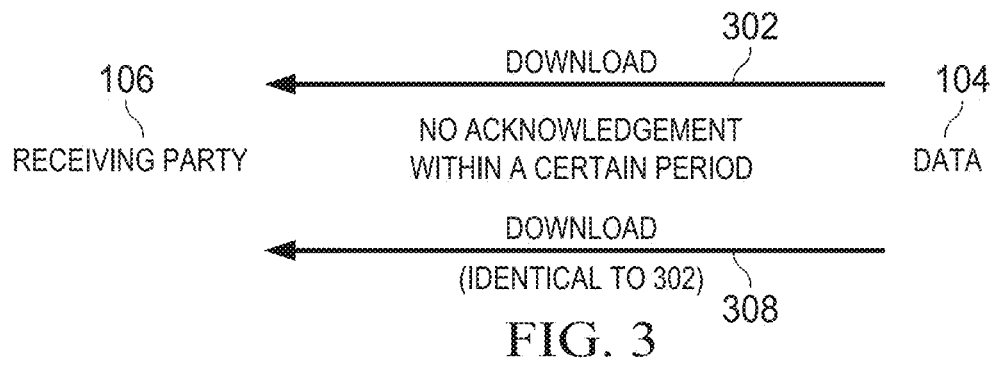
FIG. 3 illustrates packet loss between a receiving party and a data transmission unit.

The final factor considered within the DQI is the packet loss percentage. Packet loss percentage is the number of packets that are lost and are required to be re-transmitted as generally illustrated in FIG. 3. Receiving party 106 makes a request to a data transmission unit 104. Responsive to the request, the data transmission unit 104 downloads data at 302 to the requesting party 106 and generates an acknowledgement of the received data. The receiving party will lose a certain percentage of the packets that are downloaded at 302. If no acknowledgement is received in a predetermined period of time. The data transmission unit 104 again downloads the data to the receiving party at 308.

Figure 4:
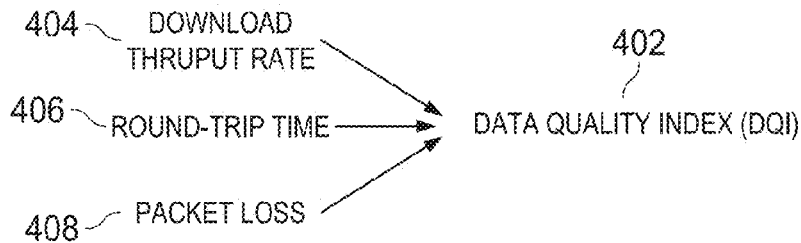
FIG. 4 illustrates the components comprising the data quality index.

Thus, as generally illustrated in FIG. 4, the data quality index 402 is generated from a combination of the download thruput rate 404, round trip time 406, and the packet losses 408. Thus, the data service quality is measure based upon how much time it takes to deliver a per unit data to the user over a certain period of time. The time component consists of two parts; transmission and user noticeable latency. The transmission time is calculated as one megabyte per unit of thruput. The user noticeable latency is a round trip time per user click. The user behavior of clicks per megabyte is correlated to the thruput in the manner described hereinabove wherein ten clicks per megabyte is the standard for browsing, two clicks per megabyte for a music download, and one click per megabyte for video. The packet loss percentage is then applied to the total time. This can be more fully illustrated according the following equation A:

$$DQIi \approx (1\ MB/Thruputi + Click_{perMB} * RTTi)/(1 - loss\ \%i)$$

$$Click_{perMB} \sim = 1000\ KB/Thruput(kbps)$$

The Thruput$^i$ is the total data thruput at a particular point in time. The "clicks per megabyte" comprise the various values described hereinabove depending upon whether the user is browsing, downloading music, or downloading videos. The round trip time (RTT i) represents the round trip time that is required for receiving downloaded information responsive to a particular click on the RAN (Radio Access Network). The RTT is reflective only of the round trip time on the wireless radio part of a data transmission and not with times required on the IP or other data networks from which data may be received. Finally, the loss % i comprises the packet loss percentage that is being experienced over a particular connection and represents the percentage of data packets that are lost responsive to any particular click request.

The value of thruput RTT and loss % are provided from the Wireless Network Guardian. The Wireless Network Guardian comprises a measuring unit that can measure these parameters (thruput, RTT, loss %) on the network, and provide information with respect to these measured values.

Equation A represents the data quality index for a particular sector of a wireless system at any particular point in time. As will be understood by one skilled in the art, a sector comprises a particular area associated with a base station antenna. The DQI values for each sector can be summed together and they are volume weighted, as illustrated in equation B:

$$DQI_M \approx \Sigma_{i=1}^n (DQIi * Volumei)/(\Sigma_{i=1}^n Volumei).$$

This enables a DQI value to be determined for any size area, or an entire system, by merely combining together the DQI values for any number of sectors.

This enables a DQI value to be determined for any size area, or an entire system, by merely combining together the DQI values for any number of sectors.

In a similar manner, a DQI may be determined on a per user basis. The equation is the same as that discussed with respect to equation A, except that the input values, rather than being associated with a particular sector, or associated with a particular user. Similarly, the DQI for a user group M comprising a particular market, a particular device model, a particular rate plan, etc., including M number of users is volume weighted according to the equation B, in order to combine together the DQIs for each user included within the user group.

Figure 5:
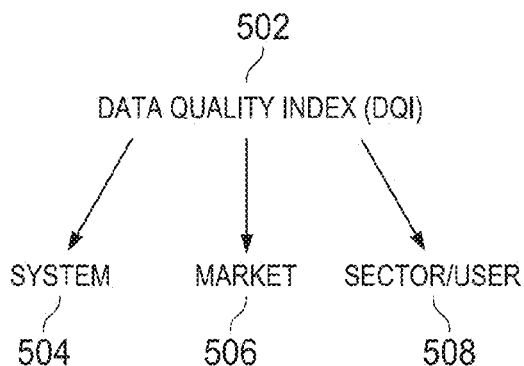
FIG. 5 illustrates the various uses of the data quality index to illustrate quality of the data connection.

Thus, as illustrated in FIG. 5, using equation A and equation B described hereinabove, a data quality index 502 can be determined on a system wide basis 504, over a selected market basis 506, or an individual sector/user basis 508, depending upon the management needs of the system provider.

Figure 6:
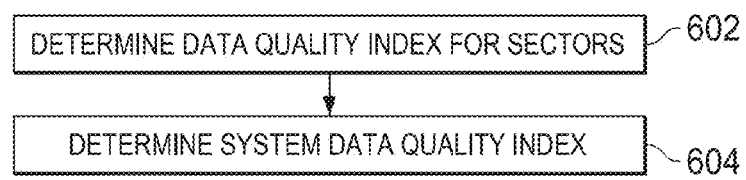
FIG. 6 is a flow diagram illustrating the manner for determining a system wide data quality index.

Thus, as illustrated in the flow diagram of FIG. 6, the system wide DQI can be determined by first determining a DQI for each of a number of sectors at step 602 that comprise the entire system. The DQIs for each of the individual sectors may be volume weighted together to determine the system wide DQI at step 604.

Figure 7:
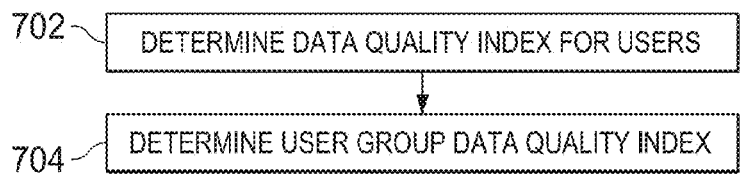
FIG. 7 illustrates the manner for determining a user group data quality index.

In a similar manner, as shown in FIG. 7, when determining DQI for a particular user group comprising a selected group of users within the system, the DQI for each of the individual users is first determined at step 702. Once the DQI for each of the users has been established, the user group DQI is determined by volume weighting the DQIs for each of the individual users together at step 704.

Figure 8:
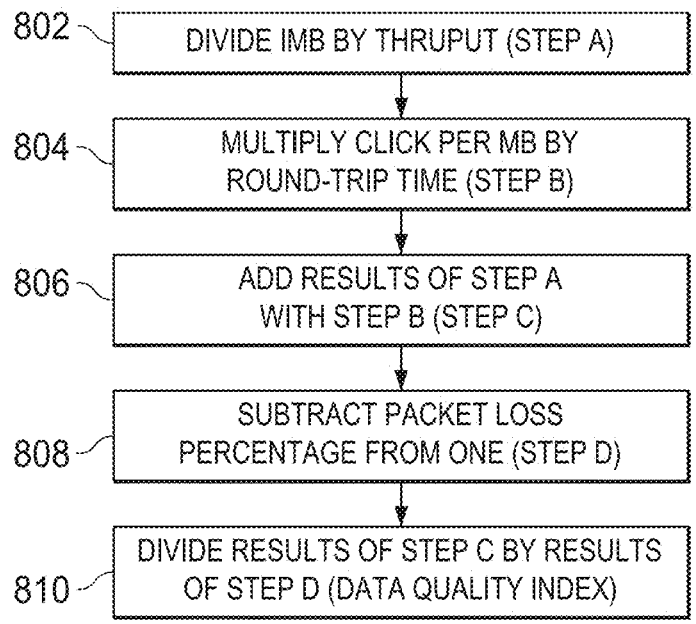
FIG. 8 is a flow diagram describing the process for determining a data quality index value.

Referring now to FIG. 8, there is illustrated a flow diagram describing the method by which the data quality index for a particular sector or a particular user is determined. Initially, at step 802, a one megabyte value is divided by the present thruput as measured by the System Measuring Guardian (Step A). Next, the particular value for clicks per megabyte that is associated with the actions of the user, i.e., browsing, music, video, is multiplied by the round trip time (RTT) as measured by the Wireless Network Guardian (Step B). The results from the division of Step A and the multiplication of Step B are added together at step 806 (Step C). Next, the packet loss % measured by the Wireless Network Guardian is subtracted from 1 at Step 808 (Step D). This value is divided at step 810 into the results of Step C to provide the final data quality index for the sector or user.

Figure 9:
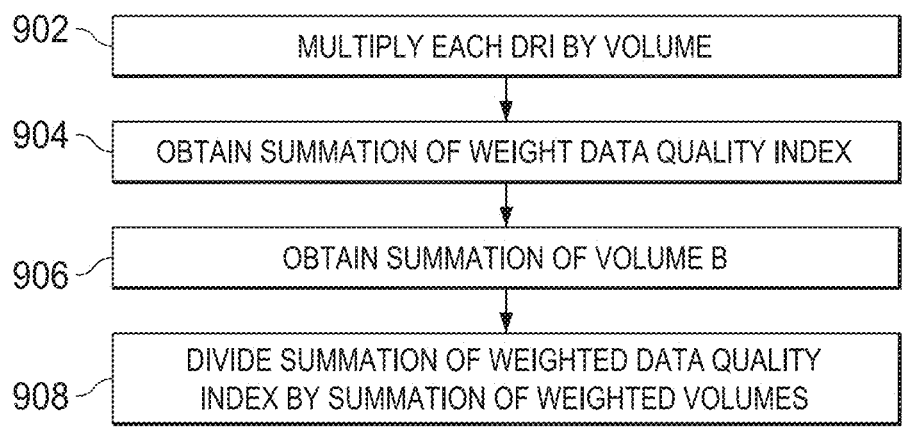
FIG. 9 is a flow diagram describing the process for determining a system or user wide data quality index.

Referring now to FIG. 9, once the data quality index has been determined for a number of sectors, or a number of individual users, a DQI for a particular system or area, or a particular group of users may be determined. In order to achieve this, the DQI for each sector or user is first multiplied by an associated volume at Step 902. A summation is obtained at Step 904 of each of these multiplied values. A summation of the volumes alone is determined at Step 906. A summation of the weighted DQI values are divided by the summation of the weighted volumes at Step 908 to determine the final weighted DQI value. This comprises the DQI for the system or group of users.

The DQI reflects the nature of the diminishing return of system thruput. The DQI per volume unit (in this case megabytes) basis, not the per unit time basis. Volume is used for data service planning so that information based on a per megabyte basis, the DQI can be easily grouped together to provide system information. They can be based upon smaller elements such as the user or sector, or grouped into larger groups such as market, network device, rate plan, etc. Another way of understanding the diminishing nature of thruput represented by DQI is that the DQI will greatly decrease as the thruput values increase at values closer to zero.

This reflects the improved nature of a data connection to, for example, transmit video. The thruput goes from zero kilobytes per second up to a higher value of kilobytes per second. However, once the thruput rate achieves a particular level, an increased thruput rate, while speeding up the transmission of video, only does so slightly as the maximum thruput value necessary for smooth video stream transmission has already been achieved. Thus, an increase of one megabyte at lower thruput levels may greatly decrease the DQI (illustrating an improvement of the data connection), while an increase of one megabyte at higher thruput levels would not achieve as great a DQI difference because the video quality is already at an optimal level.

Figure 10:
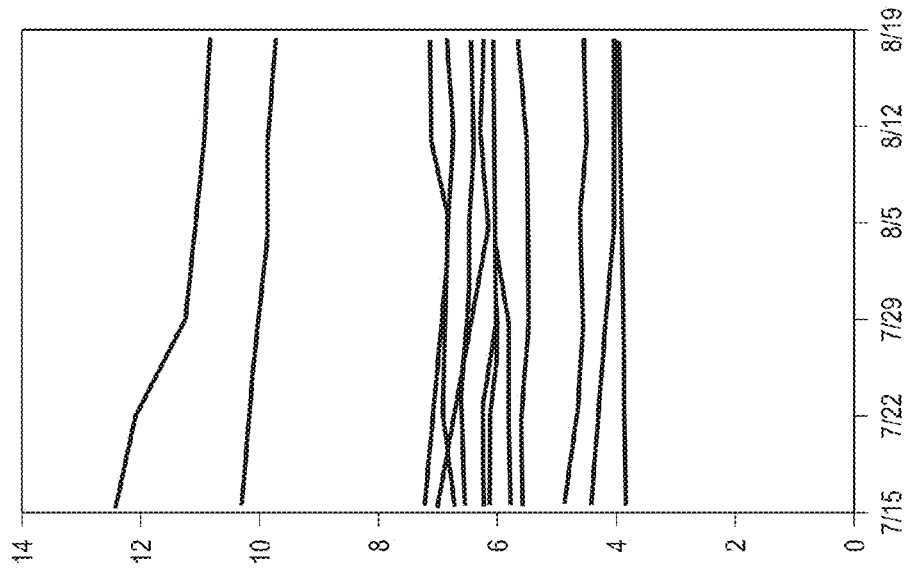
FIG. 10 illustrates a first application of the data quality index within a wireless communication system.

The DQI can be determined on a system wide basis, and used for comparison purposes in order to provide analysis of the operation of systems and provide information as to where improvements may be sought. One example of an application of the use of the data quality index value is illustrated in FIG. 10. In this chart, the DQI for a number of LTE systems is illustrated. The chart indicates a number of dates for one week periods across the top. From top to bottom are listed a number of markets associated with a particular service provider. For example, Philadelphia (PHL), Boston (BOS), and northern Florida (NFL), and Dallas Fort-Worth (DFW) are shown. Each of these cities listed along the left side of the chart has associated therewith a particular DQI value on the particular dates. The row associated with the value "all" indicates the average DQI for the entire service provider network. The "all" values would comprise the average from each of the individual cities. Thus, for example, on July 29, the city of Philadelphia had a DQI of 11.2, and San Francisco had a value of 6.9 while northern Florida had a value of 4.2 and Dallas Fort-Worth had a DQI value of 3.9. The DQI for the entire system was 6.0.

This information may be used by the network providers to determine where improvement in their data connection is required, and may be used for achieving a particular metric, for example, an overall average DQI for the system of 6.0, and determine whether these metrics are being met.

Figure 11:
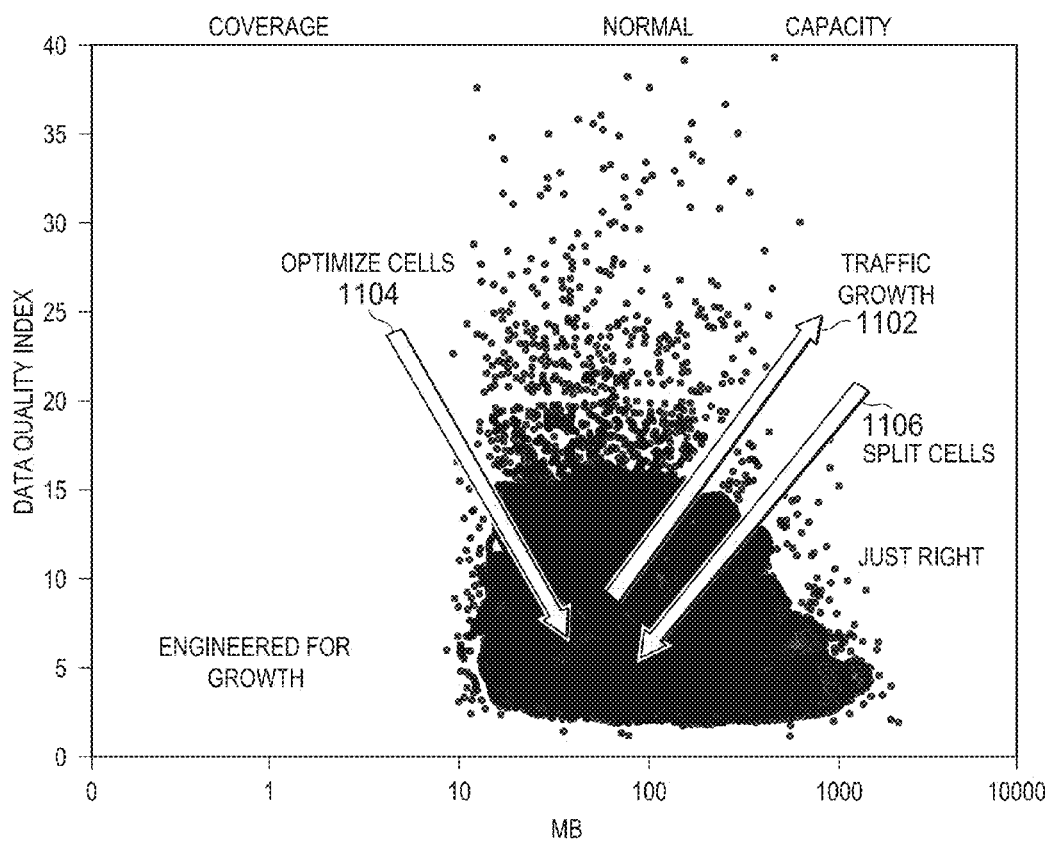
FIG. 11 illustrates the data quality index with respect to system thruput.

Referring now to FIG. 11, there is illustrated a chart showing values of DQI versus system thruput for a number of individual sectors. Each of the dots within the figure represent a DQI for a particular sector. A number of arrows are included within the figure that illustrate the general direction of movement of the dots responsive to changes in system network factors. For example, if traffic were to grow in the system, the movement of the grouping of dots would be generally in the direction 1102. This would be reflective of an increase in traffic growth, which would increase thruput due to the increased traffic, but decrease the DQI as the higher traffic would provide lower data quality connection levels.

Similarly, if the system provider optimized the operation of their cells and the associated sectors associated therewith, movement of the DQI values would be seen generally in the direction indicated by arrow 1104. This would be reflective of a decrease (improvement) in the DQI level and an associated increase in thruput level due to the cell optimization. Finally, if cells were split, a movement and direction indicated by arrow 1105 would be observed. This would reflect a decrease (improvement) in the DQI, but a decrease in thruput due to the split cells. This would enable the engineering departments to review and analyze the operation of the system, utilizing the DQI value.

Figure 12A:
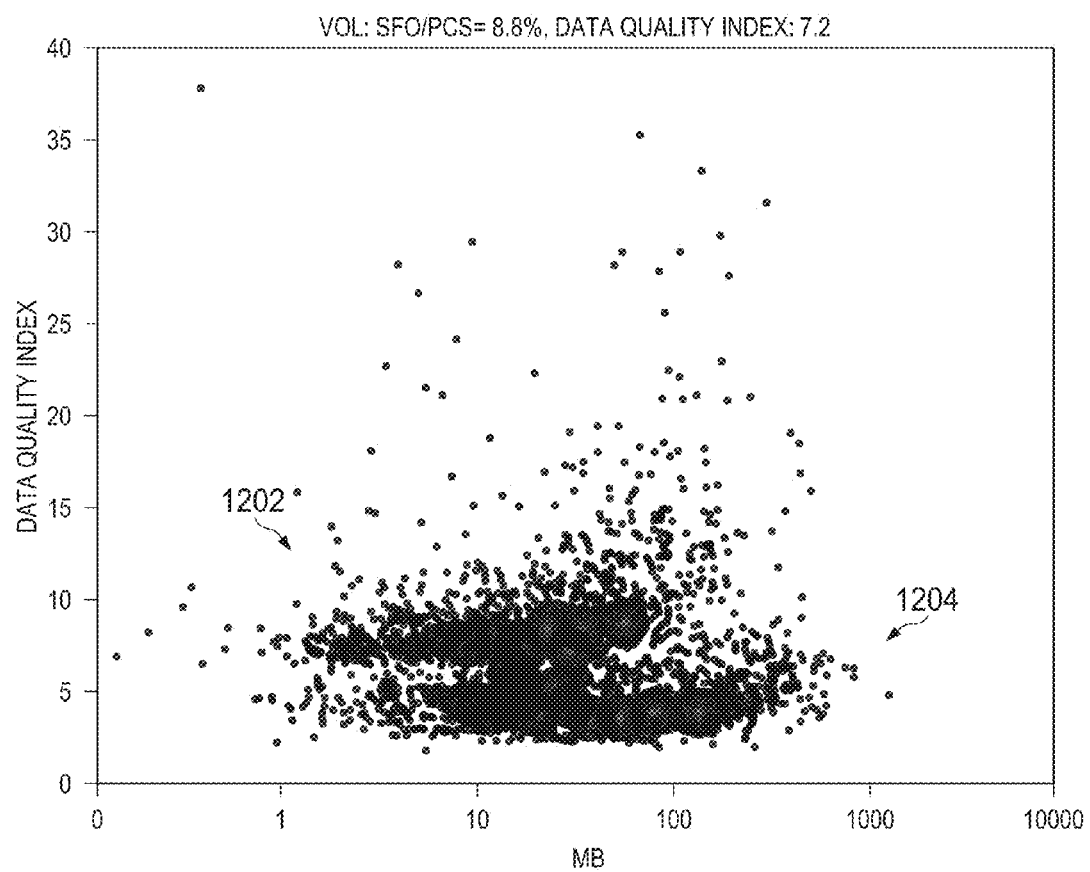
FIG. 12A illustrates Data Quality Index vs thruput for a dual band system.
Figure 12B:
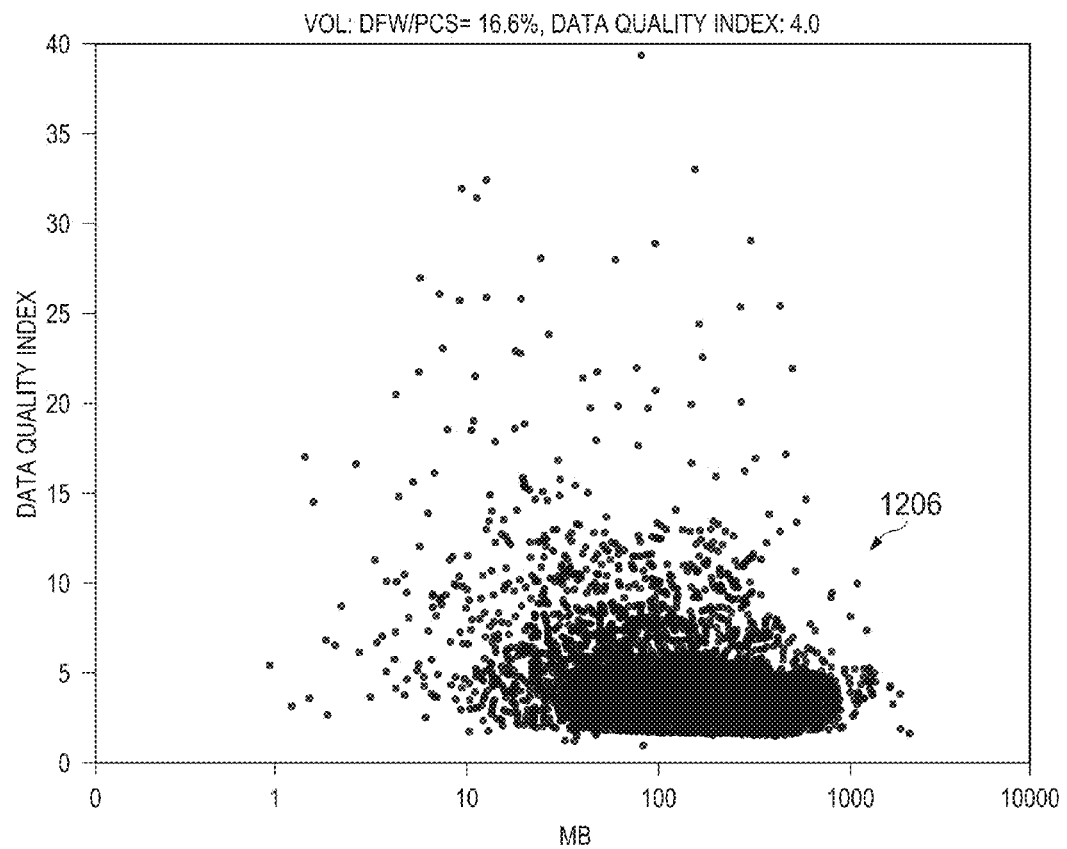
FIG. 12B illustrates Data Quality Index vs thruput for a single band system.

Referring now to FIGS. 12A and 12B, there is illustrated the way in which the DQI versus thruput plot may reflect the operation of differing systems. FIG. 12A illustrates a system in San Francisco including operation at two different bandwidths. The first grouping of dots 1202 represent a first bandwidth, and a second grouping of dots 1204 represent operation of sectors using a second bandwidth. FIG. 12B represents a second system utilizing only a single bandwidth with all operating sectors having an overall DQI of approximately four, providing only a single grouping of DQI indicators.

Thus, using the above described method, the data quality index may be generated for any number of sectors or users in order to analyze the quality of the data connection associated with the sectors or users. This information may then be compiled in any desired fashion to enable the marketing department, systems engineering department, or management department of a cellular network services provider in order to analyze the operation of their system and optimize the operations with respect to their department's goals.

It will be appreciated by those skilled in the art having the benefit of this disclosure that this system and method for determining data service quality index for a wireless data connection provides a an improved manner for qualifying the quality of a data connection. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for determining a quality of a wireless data connection on a radio access network, comprising:
   dividing, at a processor on the radio access network, a predetermined data value by a thruput of the wireless data connection to obtain a transmission time value;
   multiplying, at a processor on the radio access network, a data round trip time by a number of clicks needed to receive the predetermined data value to obtain a second value;
   adding, at a processor on the radio access network, the transmission time value to the second value to obtain a third value;
   subtracting, at a processor on the radio access network, a packet loss percentage from one to obtain a fourth value; and
   dividing, at a processor on the radio access network, the third value by the fourth value to obtain a data quality index value representative of the quality of a wireless data connection.

2. The method of claim 1, wherein the thruput of the wireless data connection, the data round trip time and the packet loss percentage are with respect to a single sector of a wireless base station.

3. The method of claim 2 further including the steps of:
   determining, at a processor on the radio access network, the data quality index value for a plurality of sectors; and
   summing, at a processor on the radio access network, volume weighted values of the plurality of data quality index values to determine a network data quality index value.

4. The method of claim 1, wherein the thruput of the wireless data connection, the data round trip time and the packet loss percentage are with respect to a single user.

5. The method of claim 4 further including the steps of:
   determining, at a processor on the radio access network, the data quality index value for a plurality of users; and
   summing, at a processor on the radio access network, volume weighted values of the plurality of data quality index values to determine a user group data quality index value.

6. The method of claim 1, wherein the predetermined data value is 1 megabyte.

7. The method of claim 1, wherein the number of clicks needed to receive the predetermined data value further comprises at least one of 10 clicks for web browsing, 2 clicks for music downloading and 1 click for video downloading.

8. The method of claim 1, wherein the packet loss percentage further comprises a percentage of packets that must be retransmitted to a receiving point.

9. The method of claim 1, wherein the data round trip time further comprises a period of time to request and download a selected amount of data over the wireless data connection.

10. A method for determining a quality of a wireless data connection, comprising:
    receiving a thruput of the wireless data connection, a data round trip time, a number of clicks needed to receive a predetermined data value and a packet loss percentage;
    dividing the predetermined data value by the thruput of the wireless data connection to obtain a transmission time value;
    multiplying the data round trip time by a number of clicks needed to receive the predetermined data value to obtain a second value;
    adding the transmission time value to the second value to obtain a third value;
    subtracting the packet loss percentage from one to obtain a fourth value;
    dividing the third value by the fourth value to obtain a data quality index value representative of the quality of a wireless data connection; and
    outputting the data quality index value.

11. The method of claim 10, wherein the thruput of the wireless data connection, the data round trip time and the packet loss percentage are with respect to a single sector of a wireless base station.

12. The method of claim 11 further including the steps of:
    determining the data quality index value for a plurality of sectors; and
    summing volume weighted values of the plurality of data quality index values to determine a network data quality index value.

13. The method of claim 10, wherein the thruput of the wireless data connection, the data round trip time and the packet loss percentage are with respect to a single user.

14. The method of claim 13 further including the steps of:
    determining the data quality index value for a plurality of users; and
    summing volume weighted values of the plurality of data quality index values to determine a user group data quality index value.

15. The method of claim 10, wherein the predetermined data value is 1 megabyte.

16. The method of claim 10, wherein the number of clicks needed to receive the predetermined data value further comprises at least one of 10 clicks for web browsing, 2 clicks for music downloading and 1 click for video downloading.

17. The method of claim 10, wherein the packet loss percentage further comprises a percentage of packets that must be retransmitted to a receiving point.

18. The method of claim 10, wherein the data round trip time further comprises a period of time to request and download a selected amount of data over the wireless data connection.

19. A method for determining a quality of a wireless data connection, comprising:
    receiving a thruput of the wireless data connection, a data round trip time, a number of clicks needed to receive a predetermined data value and a packet loss percentage;
    determining a data quality index value for the wireless data connection according to the equation:

$$DQI^i \approx (1 \text{ MB}/\text{thruput}^i + \text{Click}_{perMB} * RTT^i)/(1 - \text{loss \%}^i)$$

$$\text{Click}_{perMB} \approx = 1000 \text{ KB}/\text{Thruput(kbps)}$$

wherein Thruput is the thruput of the wireless data connection, RTT is the data round trip time, $\text{Click}_{perMB}$ is the number of clicks needed to receive the predetermined data value and loss % is the packet loss percentage; and
    outputting the data quality index value.

20. The method of claim 19, wherein the thruput of the wireless data connection, the data round trip time and the packet loss percentage are with respect to a single sector of a wireless base station.

21. The method of claim 20 further including the step of determining a network data quality index value according to the equation:

$$DQI_M \approx \Sigma_{i=1}^{n}(DQIi * \text{Volume}i)/(\Sigma_{i=1}^{n} \text{Volume}i).$$

22. The method of claim 19, wherein the thruput of the wireless data connection, the data round trip time and the packet loss percentage are with respect to a single user.

23. The method of claim 22 further including the step of determining a user group data quality index value according to the equation:

$$DQI_M \approx \Sigma_{i=1}^{n}(DQIi * \text{Volume}i)/(\Sigma_{i=1}^{n} \text{Volume}i).$$

24. The method of claim 10, wherein the number of clicks needed to receive the predetermined data value further comprises at least one of 10 clicks for web browsing, 2 clicks for music downloading and 1 click for video downloading.

25. The method of claim 10, wherein the packet loss percentage further comprises a percentage of packets that must be retransmitted to a receiving point.

26. The method of claim 10, wherein the data round trip time further comprises a period of time to request and download a selected amount of data over the wireless data connection.

27. The method of claim 1, wherein the processor comprises a data transmission unit.

* * * * *